United States Patent [19]

Muramoto et al.

[11] Patent Number: 5,161,070
[45] Date of Patent: Nov. 3, 1992

[54] AUDIO SIGNAL RECORDING APPARATUS

[75] Inventors: Tomotaka Muramoto, Tokyo; Hirokazu Takahashi, Kanagawa; Hiroyuki Horii, Tokyo; Masashi Hori, Kanagawa, all of Japan

[73] Assignee: Canon Kabushiki Kaisha, Tokyo, Japan

[21] Appl. No.: 824,697

[22] Filed: Jan. 21, 1992

Related U.S. Application Data

[63] Continuation of Ser. No. 697,911, May 1, 1991, abandoned, which is a continuation of Ser. No. 192,949, May 12, 1988, abandoned.

[30] Foreign Application Priority Data

May 16, 1987 [JP] Japan ................................. 62-119552
May 16, 1987 [JP] Japan ................................. 62-119800

[51] Int. Cl.$^5$ ............................................. G11B 5/09
[52] U.S. Cl. ......................................... 360/8; 360/74.1
[58] Field of Search ................................. 360/8, 74.1

[56] References Cited

U.S. PATENT DOCUMENTS 4,814,905 3/1989 Hashimoto ........................ 360/74.1

Primary Examiner—Vincent P. Canney
Attorney, Agent, or Firm—Robin, Blecker, Daley & Driscoll

[57] ABSTRACT

A recording apparatus for recording sounds continuously over a plurality of successive tracks is provided with pause command means arranged upon actuation to terminate the recording on the track being accessed at present time, and upon deactuation to alter the access of the recording head to a different track from that accessed track in which recording of sound is started again.

12 Claims, 8 Drawing Sheets

FIG.5

| SECTOR TYPE | POLARITY (START FLAG) | POLARITY (END FLAG) | MEANING |
|---|---|---|---|
| TYPE 1 | HIGH LEVEL | LOW LEVEL | CONTINUE TO NEXT SECTOR |
| TYPE 2 | HIGH LEVEL | LOW LEVEL | CONTINUE TO SECTOR #0 IN NEXT TRACK |
| TYPE 3 | HIGH LEVEL | HIGH LEVEL | SEQUENCE ENDS IN THIS SECTOR |
| TYPE 4 | LOW LEVEL | HIGH LEVEL | THIS SECTOR IS NOT USED |

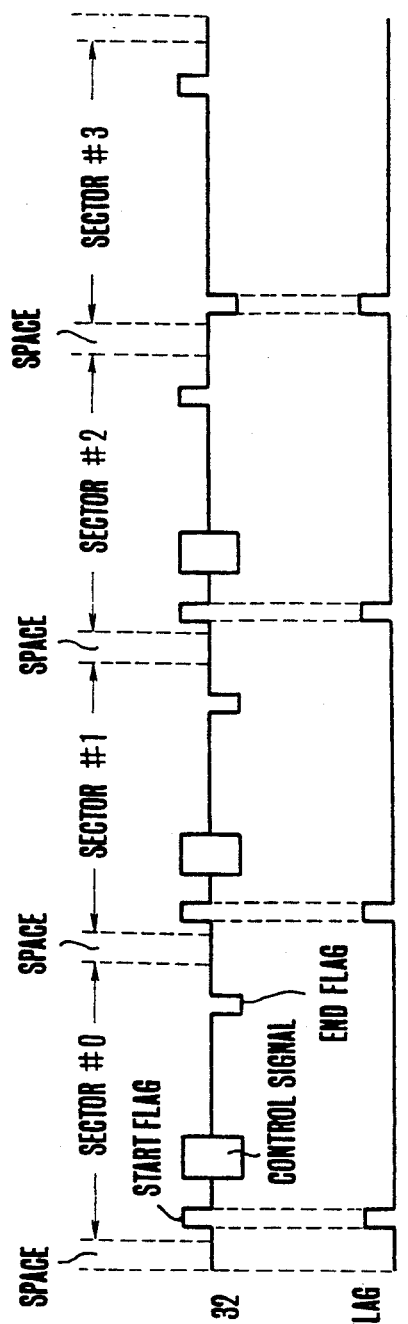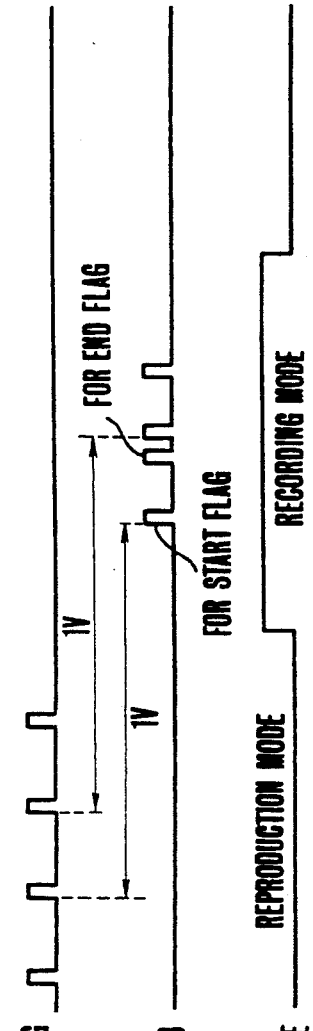

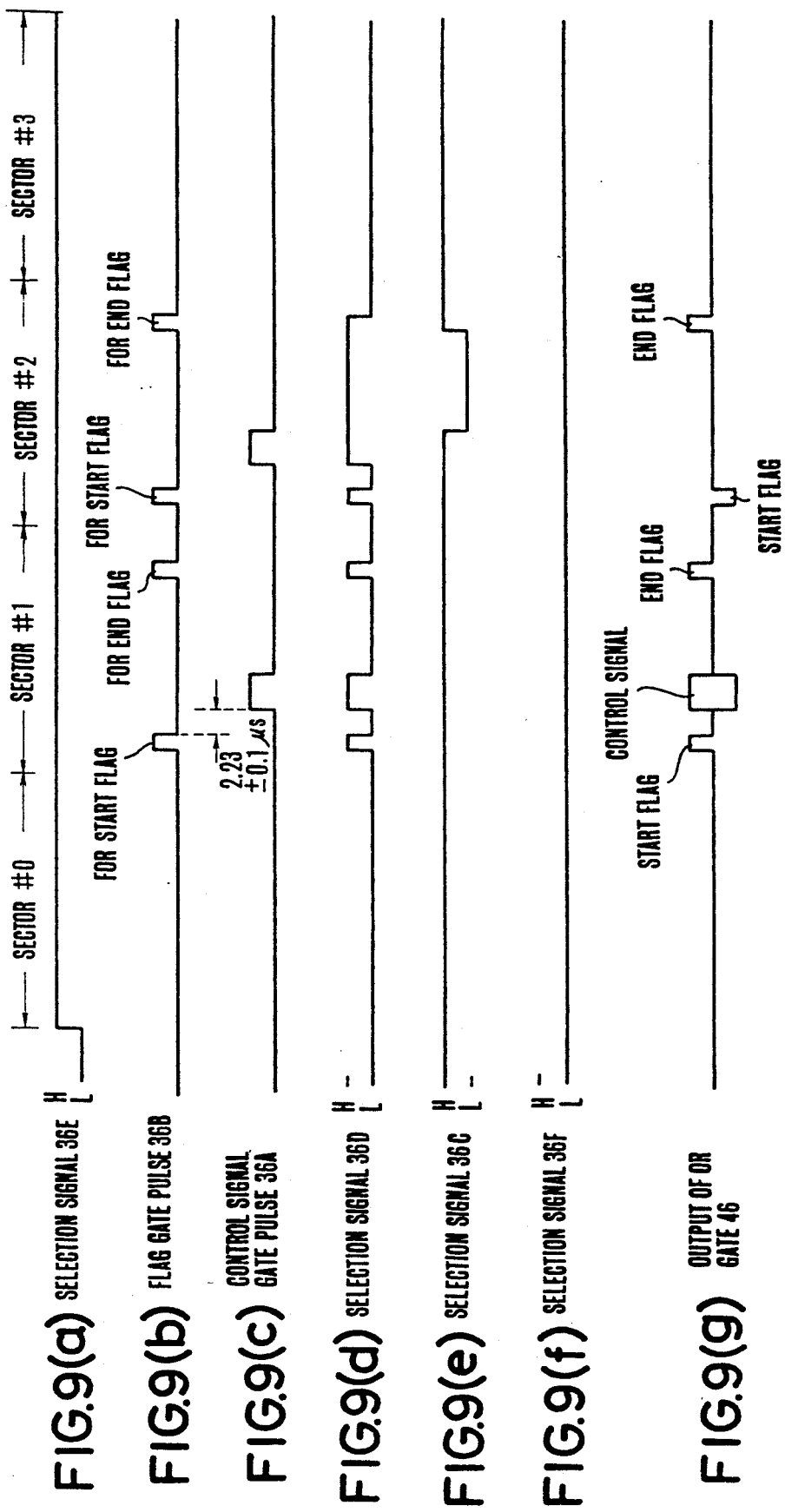

AUDIO SIGNAL RECORDING APPARATUS

This is a continuation application under 37 CFR 1.62 of prior application Ser. No. 697,911, filed May 1, 1991, now abandoned which is a continuation application under 37 CFR 1.62 of prior application Ser. No. 192,949, filed May 12, 1988 now abandoned.

BACKGROUND OF THE INVENTION

1. Field of the Invention

This invention relates to recording apparatus capable of recording video signals and audio signals.

2. Description of the Related Art

Up to now, the only recording apparatus capable of recording video signals and audio signals at once was the VTR. Upon the advent of a new recording medium or video floppy disk, the standards for still video systems using the same have now been announced, and development of products is taking place.

Of the aforesaid standards, the method of recording still image signals and audio signals at once is that for one track of the video floppy disk, one field of still image can be recorded along with audio signals compressed 320, 640 or 1280 times in the time axis for 5, 10 or 20 seconds respectively.

Also, the audio signals may be recorded over a plurality of successive tracks, and, moreover, transition to the next track can occur at a desired time if within the maximum recording time of one track.

As to the correspondence between the audio signal and the still image, in view of assigning one track for sound to one field of still image, if a desired period of recording the image is set in, it is in this period that the recording of the audio signal can be in transit from one track to the next.

In actual practice of audio recording, however, the sounds which are desired to be continuous when in reproduction are not always continuous when in recording.

For example, a series of continuous sounds are separated off into the parts of music or narration which are desired to be added to the respective individual frames of images. As in interviews, bits of sounds in turn are recorded. In such cases, it has been the common practice in the prior art that the sounds to be recorded floppy disk must first be edited to the continuous form by using an audio tape or the like.

Another separating technique is to use the record stop (REC STOP) switch. But in this case, the sequence of operations of the apparatus is caused to abruptly terminate. Therefore, when the thus-recorded floppy disk is later reproduced, the sounds do not come up continuously.

SUMMARY OF THE INVENTION

It is, therefore, a first object of the invention to eliminate such problems.

Under such an object, the invention is to provide a recording apparatus which enables a series of continuous audio signals to be separated off into parts of desired lengths and any combinations of these parts to be made up.

Another object of the invention is that when a series of continuous audio signals are being recorded, it is made possible to interrupt that recording in desired timing.

Under such an object, according to a preferred embodiment of the invention, the recording apparatus in which sounds are continuously recorded over a plurality of successive tracks is provided with pause commanding means arranged upon actuation to cause the recording on a track which is being accessed at present to be terminated, and upon deactuation to alter the access to the above-identified track to another track on which recording of subsequent sound is then initiated.

Still another object of the invention is to provide a recording apparatus using a recording medium having information signals recorded together with control signals for controlling the reproduction of the information signals with a device of simple structure making it possible to rewrite the aforesaid control signals.

A further object of the invention is to provide a recording apparatus in which, for a medium having information recorded in divided forms on a plurality of sectors, each of which sectors is recorded with the aforesaid control signals, it is made possible to simply rewrite the aforesaid control signals.

Under such objects, according to a preferred embodiment of the invention, an apparatus is disclosed wherein each record track consists of one sector or a plurality of divided sectors and while the recording medium having recorded thereon signals and information associated therewith is being driven at a predetermined speed, the associated information is edited in unit areas of the sectors. For this purpose, the apparatus is constructed as comprising detecting means for detecting a time at which the sector begins, means responsive to detection of that time by the detecting means for producing a timing signal corresponding to an area in which the information of that sector which is selected for editing is to be recorded, and recording means responsive to the timing signal for recording on that area new information with which the aforesaid signals are to be associated.

In such an apparatus, due to the maintenance of the constant speed of movement of the aforesaid recording medium when the time of start of the sector is detected, it is very easy to determine when that sector which is to be edited subsequently arrives at the recordable position. Hence, a gating signal of corresponding period to that area of the sector to be edited which is to be recorded with its associated information can also be formed simply. The use of this gating signal in controlling the recording of new associated information in the area specified therefor provides a possibility of changing the associated information without affecting the signal itself, when editing is carried out.

A further object of the invention is to provide a recording apparatus which matches the standards of the still video system and has novel functions.

These and other objects and features of the invention will become apparent from the following description of embodiments thereof by reference to the drawings.

BRIEF DESCRIPTION OF THE DRAWINGS

FIG. 5 is a table showing what instructions the combinations of the levels of the start and end flags have.

FIGS. 7(a), 7(b), FIGS. 8(a)–8(c) and FIGS. 9(a)–9(g) are timing charts illustrating a manner in which the apparatus of FIG. 6 operates.

DETAILED DESCRIPTION OF THE PREFERRED EMBODIMENTS

In embodiments to be described below, the recording apparatus of audio aspect based on the standards for still video floppy disks is exemplified. It is, however, to be understood that the present invention is not confined thereto.

Also, in the apparatus used in this embodiment, when audio signals are recorded in concentric tracks formed on the video floppy disk, the track is divided into four sectors, and signals called "start flag" and "end flag" are added to each of the sectors. Depending on the combinations of the polarities of these two flags shown in the table of FIG. 5, determination is made of whether the sound recorded in a given one of the sectors continues to the sound recorded in another one of the sectors in the same track, or in another track, and whether or not it comes at the end of the sequence.

The recording format of audio signals is briefly explained here by using the drawings.

Figure 4A:
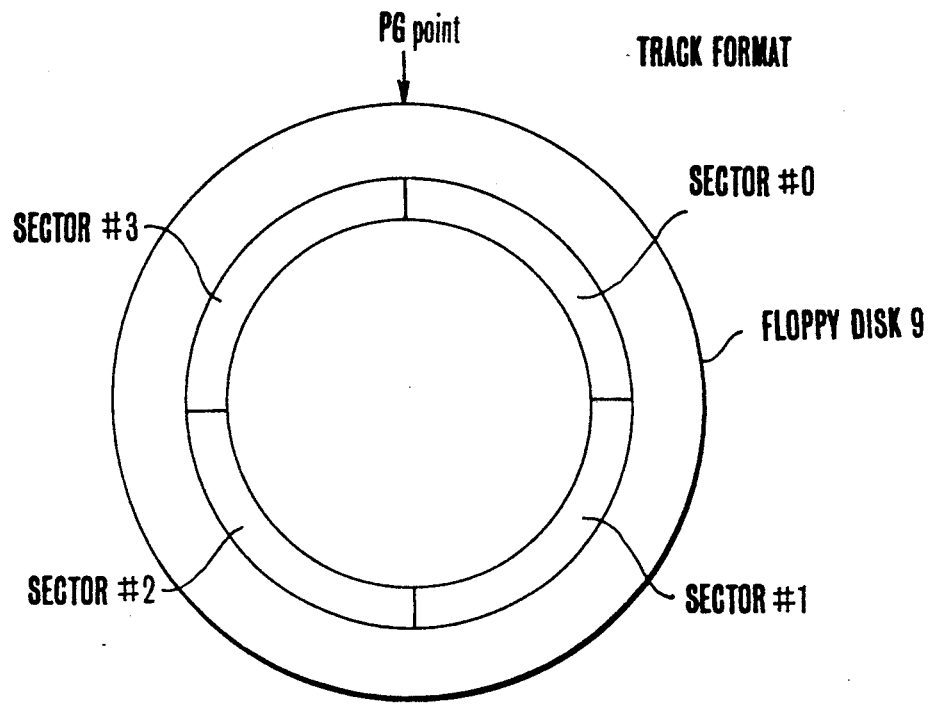
FIGS. 4(a) and 4(b) are views of a record format on a video floppy disk 9.
Figure 4B:
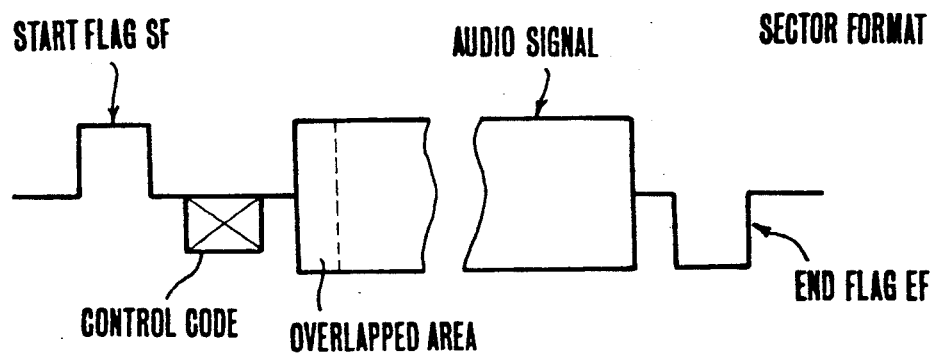

FIG. 4(a) shows one of the tracks which are formed on the floppy disk when sounds are recorded. The audio track is divided into four sectors #0–#3. The format of each of the sectors is shown in FIG. 4(b). For every one sector, in order to indicate its start position, the start signal is recorded in the form of a start flag SF. Next to this comes a control code representing the rate of compression of the time axis of the audio signal and the address of the video signal corresponding to the audio signal. In the case when a series of continuous audio signals is to be recorded over a plurality of successive tracks, the information representing the addresses of that track at which the sound recording starts and that track in which the subsequent sound is to be recorded is included in the control code for reproduction of the audio signal tracks. It should be also noted that the plurality of successive tracks in which sounds are recorded continuously are considered as one group, which is hereinafter called "one audio sequence". Even in the case of only one track sufficient to complete the recording of audio signal, this is called "one audio sequence".

Figure 1:
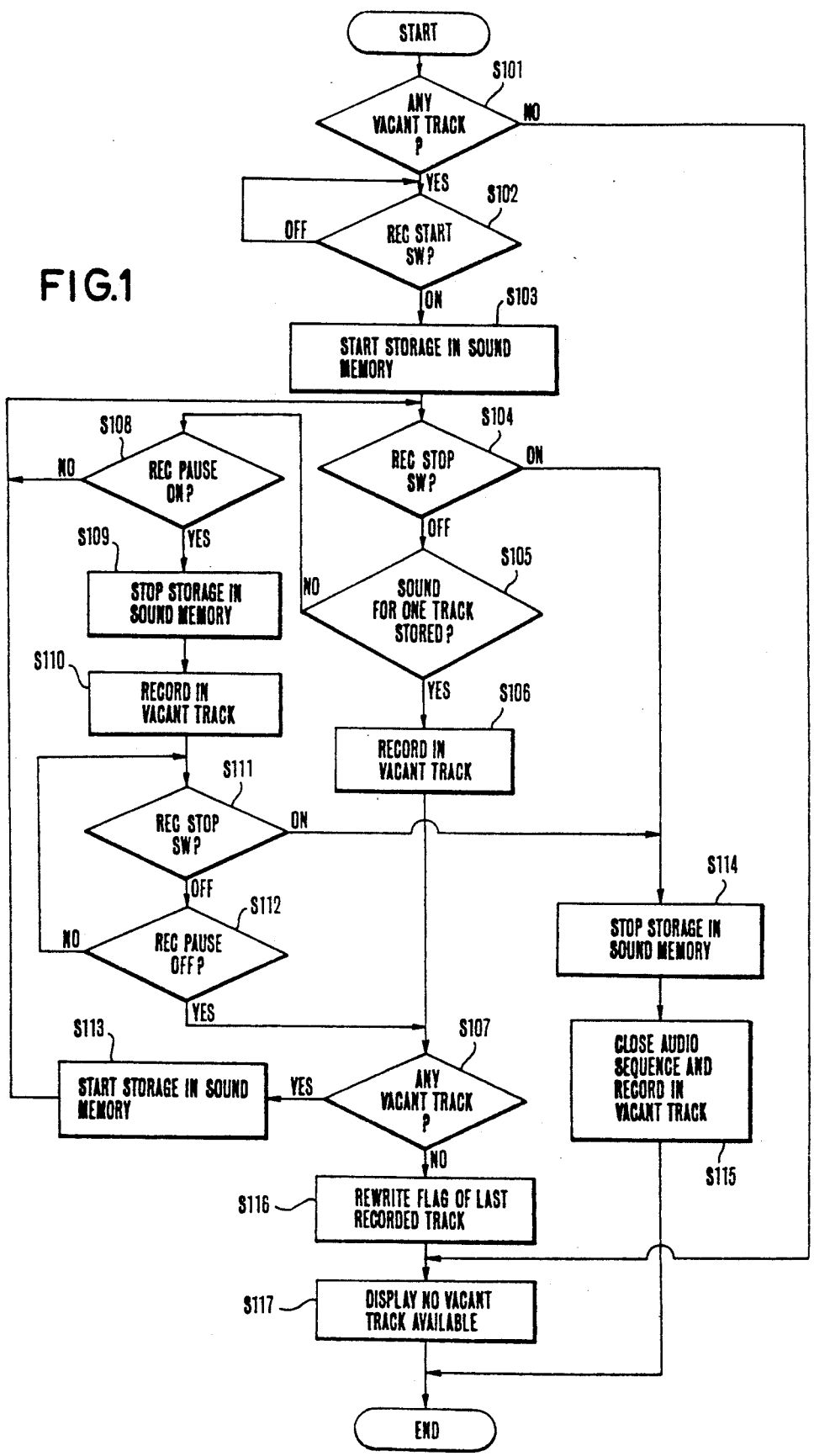
FIGS. 1 and 2 are flowcharts for the operation of the apparatus of the invention.

In FIG. 1 there is shown a flowchart for the control system of the recording apparatus which embodies the invention. The constituent parts of this apparatus are also shown in FIG. 3.

Figure 3:
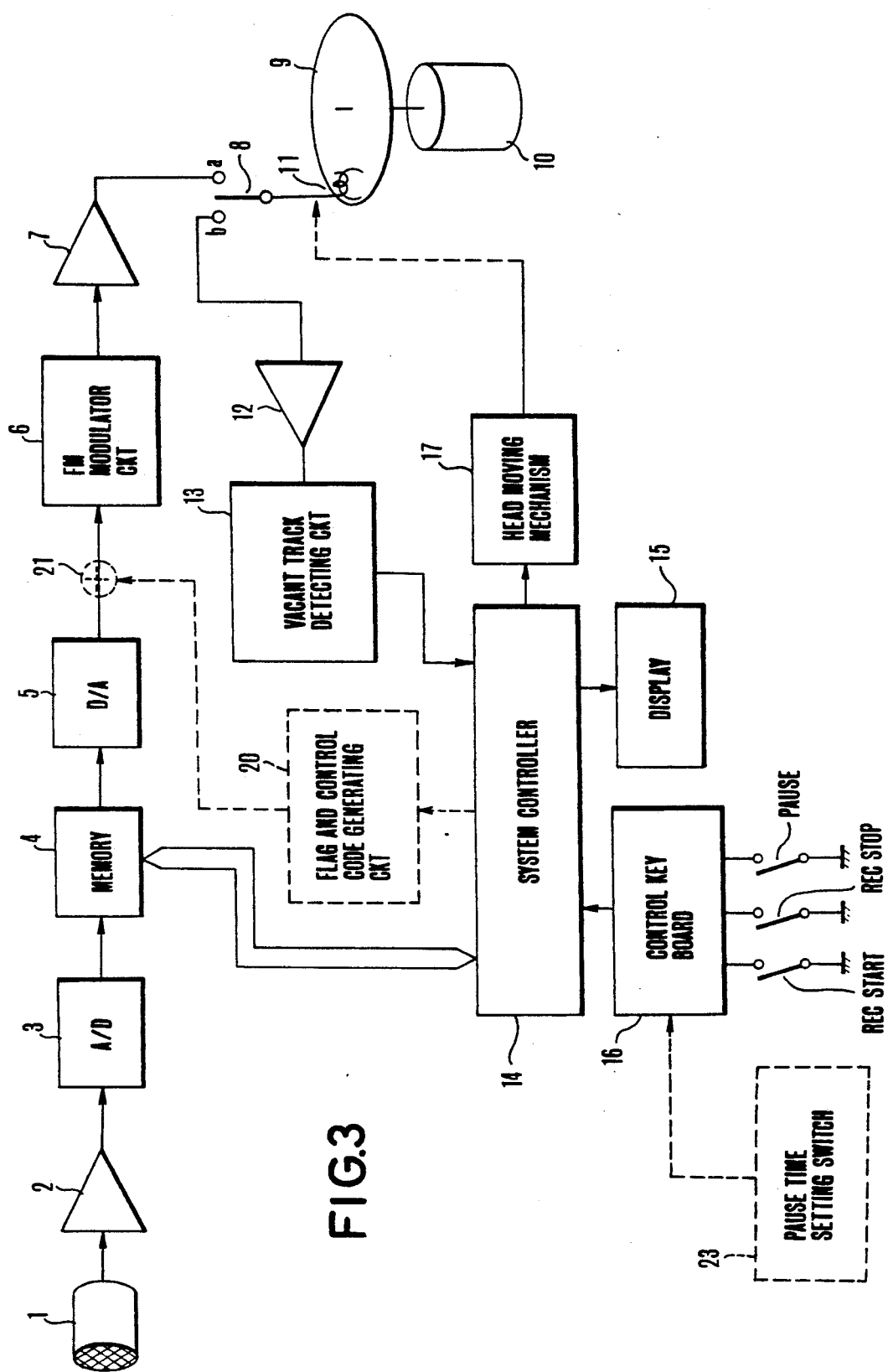
FIG. 3 is a block diagram illustrating the structure of an embodiment of the apparatus according to the invention.

Referring first to FIG. 3, the apparatus includes a microphone 1 at which sound waves enter, an amplifier 2 for amplifying the output of the microphone 1, an A/D converter 3 for converting the sound waves to digital form, and a memory 4 for applying compression to the time axis of the sound waves, as its reading and writing are controlled by a system controller 14. In more detail, the speeds at which the data are written into, and read from, the memory 4 are differentiated from each other, when the time axis is compressed. Also included are a D/A converter 5 for restoring the sound wave, an FM modulator circuit 6, a recording amplifier 7, a selection switch 8 having a position "a" in which a magnetic head 1 records signals on the video floppy disk 9 and another position "b" in which the recorded signals are reproduced from the floppy disk 9, an electric motor 10 for rotating the video floppy disk 9, a pre-amplifier 12 for amplifying the reproduced signals, a vacant track detecting circuit 13 for detecting vacant tracks depending on whether or not the reproduced signal is present and a display 15 for displaying the state of the apparatus.

16 is a control keyboard having various switches with inclusion of a REC START switch for initiating an audio signal-writing operation of the memory 4, a REC STOP switch for terminating the writing operation and at the same time initiating an operation of reading out the stored audio signals in the memory 4 and recording them on the floppy disk with a supplement of a type 3 of the combinations of the flags shown in FIG. 5, and a PAUSE switch for stopping, for a while, the operating of bringing the audio signal into the memory 4, and at the same time initiating an operation of reading out the written audio signal from the memory 4 and recording them on the floppy disk 9 with a supplement of a type 2 of flag combination shown in FIG. 5. A head moving mechanism 17 is responsive to the output of the vacant track detecting circuit 13 to move the head 11 so as to access the vacant track.

Though, in this embodiment, the method of supplementing the audio signals with the flags and the control code shown in FIG. 4(b) or FIG. 5 is that the system controller 14 itself generates digital signals representing the flags and the control code to be written into the memory 14 just during the time when it permits the audio signals to be written in the memory 4, this may be carried out in another way as shown by dashed lines in FIG. 3 by using a flag and control code generating circuit 20 for generating the flags and the control code. Circuit so is controlled by the system controller 14, and an adder 21 is provided for adding the output of this circuit 20 to the output of the D/A converter 5.

Referring now to FIG. 1, one practical example of the program for the embodiment of the invention is described below.

When starting to record recording sound, the procedure begins with a step S101 of checking whether or not a vacant track is present. If not, then the display 15 (S117) indicates not to accept the recording operation. With the presence of a vacant track, when the REC START switch in the control keyboard 16 turns on (S102), the audio signal starts to be written in the memory 4 (S103). After the audio signal for one track has been stored in the memory 4, the content of the memory 4 is compressed in the time axis at the rate (320, 640, 1280) preset in the system controller 14, then FM-modulated and then recorded (S106). And, whether or not any vacant track is present is checked (S107). If present, then recording of the subsequent sound is continued. If absent, then the flag in the last recorded track is changed to a flag which represents the end of the sequence, and the flag is re-recorded (S116). The display 15 thus informs the operator of the fact that no vacant track is available in the floppy disk 9 (S117).

Assuming that the PAUSE switch is pushed down at a middle time in the period of storing the audio signal to render the apparatus in the pause-mode-on state, then the memory 4 is stopped from further storing the audio signal (S109). That part of the audio signal which the memory 4 has stored up to that time point is then recorded in the vacant track (S110). If here the REC STOP switch is pushed down, then the flag is changed to a flag representative of the end of the sequence, and the flag is re-recorded (S115). Thus, the recording operation terminates. Also, if, instead of the REC STOP switch, the PAUSE switch is pushed down for the second time, then whether or not any vacant track is present (S112, S107) is determined. If present, then writing the audio signal in the memory 4 is restarted (S113).

Such a procedure is performed repeatedly until the REC STOP switch is pushed down or no vacant track becomes available.

Figure 2:
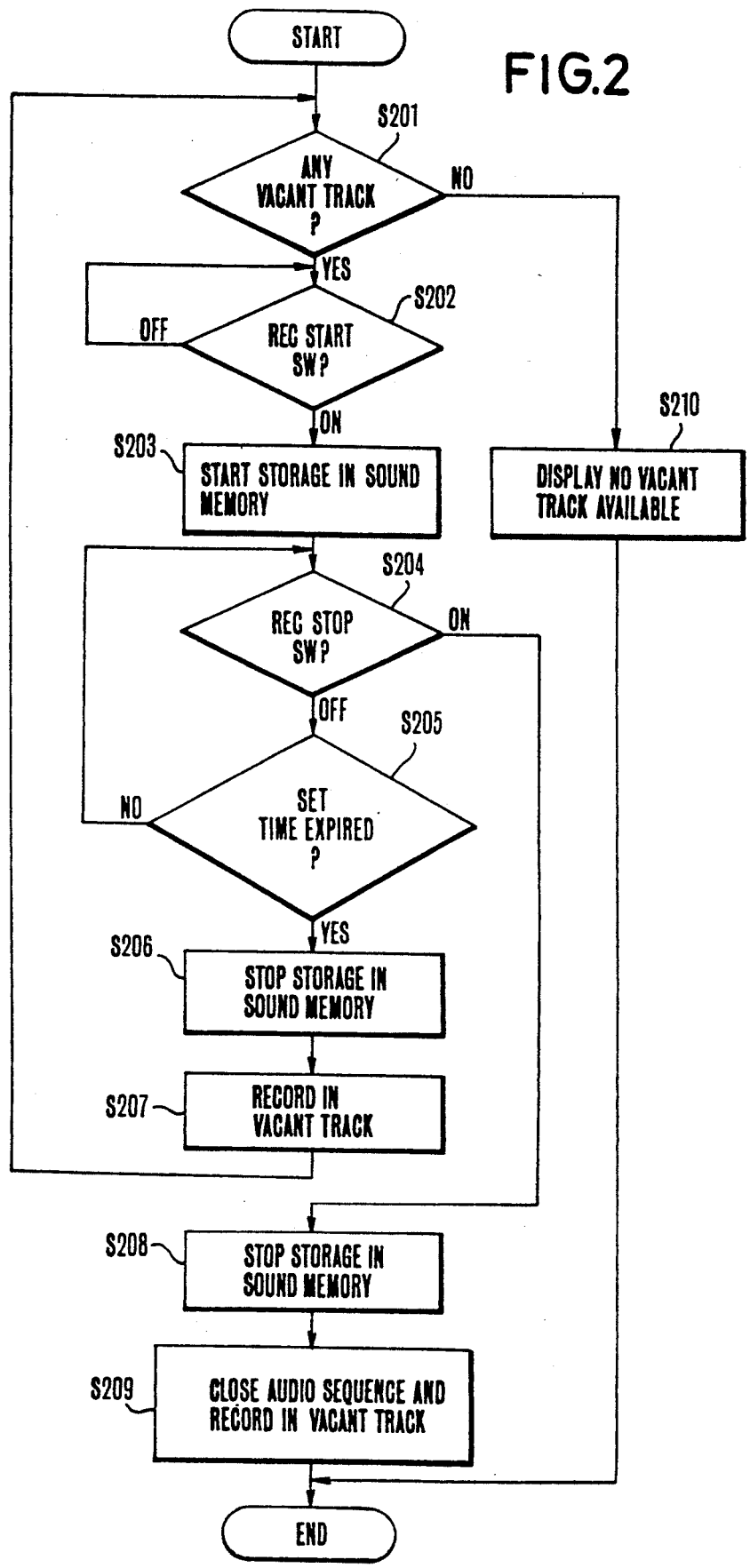

Next, another embodiment of the invention is described using the flowchart of FIG. 2.

The start of sound recording is preceded first by checking whether or not there is a vacant track available (S201). If not, then the recording command is dejected, while indicating this on the display 15 (S210). With the detection of a vacant track available, when the REC START switch in the control key board 16 turns on (S202), the audio signal from the A/D converter 3 starts to be written in the memory 4 (S203). It is before the audio signal starts to be recorded that test is made as to whether or not the audio signal stored on the memory 4 has amounted up to a time previously set in the system controller 14, or the memory capacity for audio signal (S205). If so, then transfer of the audio signal to the memory 4 is stopped (S206), and recording of the stored audio signal in the vacant track on the recording medium is started while compressing it at the rate also previously set in the controller 14 (S207). And, the examination of whether or not any vacant track is available (S201) is followed by entering the pause state. When the pausing is interrupted by pushing down the REC START switch, the audio signal starts again to be transferred again to the memory 4. Such a procedure repeats itself until the user pushes down the REC STOP switch, or until no vacant track is available for recording on the used floppy disk 9. In short, the program in the flowchart of FIG. 2 makes it possible, without having to trouble the user, to automatically transit to the pause state.

Here, what is to be recorded after the re-start from the pause state continues from that part of the audio signal which had been recorded before the pause, and is in a different track from that accessed before the restart. How to handle the PAUSE and STOP switches is similar to that described in connection with FIG. 1. Also, in order to automatically render the apparatus to the pause state, to be preset before the recording is not limited to the maximum possible recording time of one track of the recording medium, but may be taken at a value for a plurality of successive tracks. Also, after each event of pause occurs, the time it takes to transit to the next pause event also can be made different from that of the preceding one.

Also, in order to effectively use the recording tracks, the entrance to the pause state is followed not immediately by the recording of the vacant track, but the recording may be made to follow the completion of storage of the audio signal for one track.

To do this, despite the occurrence of the entrance into the pause state, recording of the vacant track is not immediately started, but a step of waiting occurs as the pause state is introduced. In the next step, the pause state is removed. It is only when the audio signal which can be recorded within one track has been stored on the memory 4 that the recording on the floppy disk 9 is started.

While in the first embodiment the pause command means use has been made of the PAUSE switch, and, in the second embodiment, use was made of the step of testing if the capacity of the memory is filled up, in this instance, the step S205, a timer circuit for detecting the memory storage may be employed instead.

Also, while in the first embodiment as the pause command means use has been made of nothing more than that the PAUSE switch under the pause condition is further operated, and, in the second embodiment, use was made of the REC START switch in the control keyboard 16, a switch solely used for releasing the system from the pause state may be employed.

In this embodiment, when a pause is commanded, the sound which has so far been stored in the memory is recorded in that track which the head 11 is accessing, and then the head 11 moves to access the next vacant track (for example, the adjacent track inside or outside the recorded track). Therefore, there are produced advantages that just after the PAUSE switch is actuated and deactuated, the memory 4 can operate from the beginning to write audio signals in and that a sufficient recording time can be secured. Thus, the manageability of the apparatus is very much improved.

While in these embodiments the disk form of recording medium has been used, it is to be understood that the invention is applicable to another type of apparatus using the tape form of recording medium having helical tracks formed thereon.

As has been described above, because in the recording mode, recording in a track is started at a time when set in the pause, even if the electrical power source accidentally turns off, the audio signal up to the time point of entrance to the pause is automatically recorded in the timing of the entrance to the pause. Therefore, the editing can be later continued again.

Also, the control key board 16 may be provided with an additional operable member as shown by a dashed line block 23 in FIG. 1 for freely setting the time of entering into the pause, whereby it is made possible to record and edit various sounds such as discontinuous voices so that they are later reproduced in continuous form.

Next explanation is given as to how to rewrite the flags in the steps S115 and S116 of the flowchart shown in FIG. 1.

In order to rewrite the flags and the control code, the process should be taken, comprising the steps of reproducing from the pertinent sector the signals, particularly the audio signals, then storing them in either the internal or the external memory, then adding new flags and control signals to the reproduced audio signals, and then re-recording them in the pertinent sector. But, the use of this process gives rise to the problem of deteriorating the audio signals due to the repetition of the recording treatment. Also, there is need to use a memory for temporary storage of the audio signals, constituting another problem.

To solve these problems, consideration may be made of the method of erasing and rewriting only the start flag portion, control signal portion and end flag portion. But it is very difficult to accurately erase only the above-identified portions to be rewritten.

So, the embodiments of the invention employ a method which allows for easy alteration of additional information for the recorded signals, namely, the start flag and control signal and the end flag for the recorded audio signal, as will be explained below.

Figure 6:
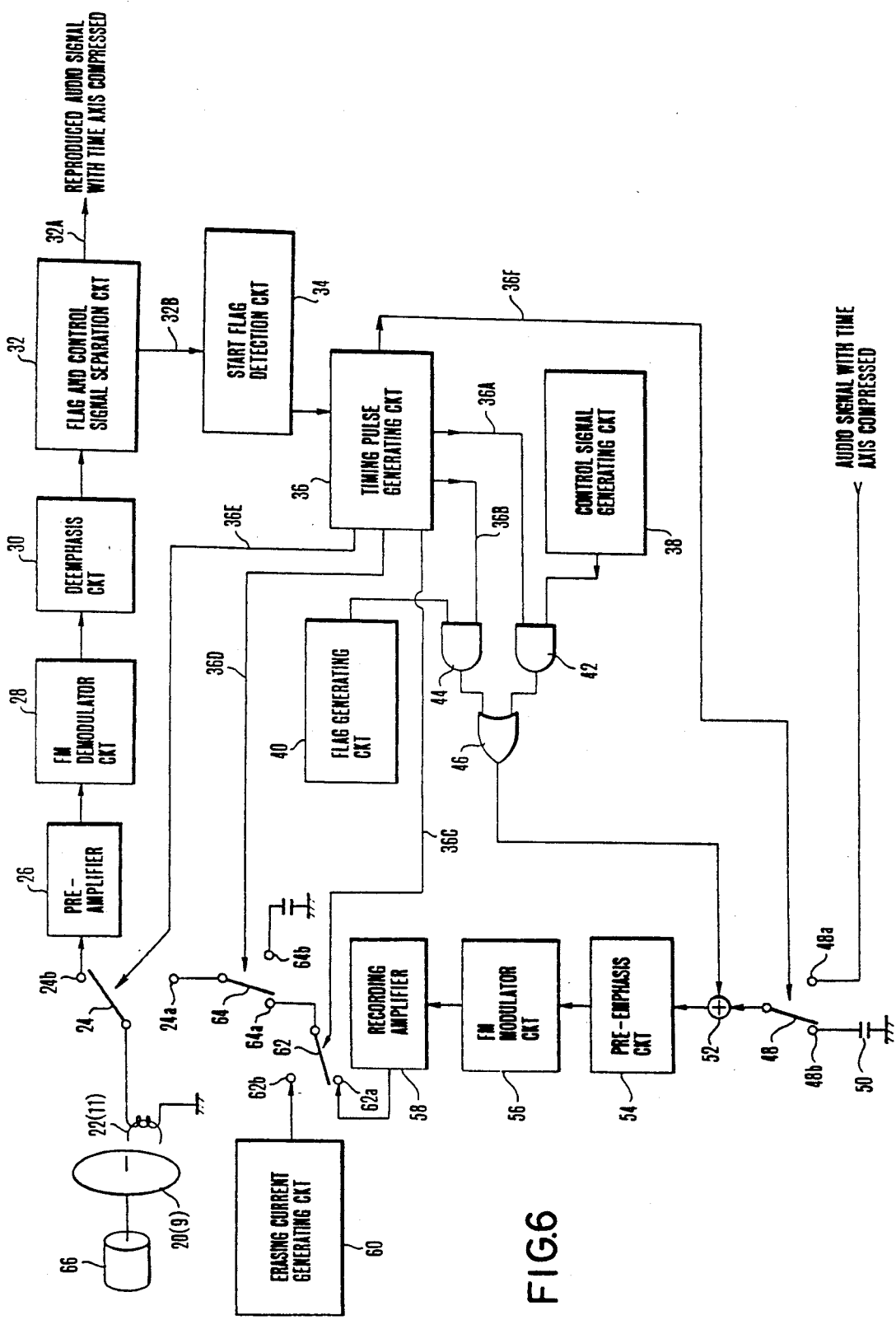
FIG. 6 is a block diagram of the construction and arrangement of the parts of a circuit suitable to execute the steps S115 and S116 shown in FIG 1.

FIG. 6 shows a circuit that carries out such a method, including a magnetic head 22 which is the same as that shown at 11 in FIG. 3 for recording or reproducing audio signals on and from a recording medium 20 which is the same as that shown at 9 in FIG. 1, a selection switch 24 for the recording and reproduction modes, a pre-amplifier 26, an FM demodulator circuit 28 and a deemphasis circuit 30. From the reproduced signals, the flag and control signals are separated by a flag and control signal separation circuit 32. At its output line 32A there appears the reproduced audio signal with the time axis compressed. Output line 32B at which the separated-off flag and control signals are produced is connected to a start flag detection circuit 34 for detecting the start flag. Upon receipt of the pulse produced from the start flag detection circuit 34, a timing pulse generating circuit 36 produces various timing signals.

Further included are a control signal generating circuit 38 for producing the aforesaid control signal to be recorded together with the compressed audio signal, a flag generating circuit 40 for producing a start flag and an end flag, two AND gates 42 and 44 and an OR gate 46. By the timing pulse from the timing pulse generating circuit 36, the AND gate 44 is opened and closed in a prescribed timing. Hence, the OR gate 46 produces the start flag, the control signal and the end flag in specific timed relationship.

A switch 48 is arranged to change its switched position depending on whether the erasing mode or the audio signal recording mode is in operation. One throw 48a of the switch 48 is supplied with the time axis compressed audio signal to be recorded, and another throw 48b is connected through a capacitor 50 to ground. An adder 52 adds to the signal from the switch 48 the flags and control signal from the OR gate 46. Further included are a pre-emphasis circuit 54, an FM modulator circuit 56, a recording amplifier 58, an erasing current generating circuit 60, a switch 62 for selectively applying the erasing current from the circuit 60 and the recording signal from the amplifier 58 to a switch 64 for controlling whether or not to carry out recording. 66 is an electric motor for rotating the medium 20.

The switches 24, 48, 62 and 64, when the selection signals 36E, 36F, 36C and 36D from the timing pulse generating circuit 36 are H (high level), have their movable poles connected to the respective throws 24a, 48a, 62a and 64a, and, when L (low level), to the respective throws 24b, 48b, 62b and 64b.

The operation of the circuit of FIG. 6 is next described not only concerning the process for rewriting the flags as is carried out in the step S116 of FIG. 1, but also in connection with a case where one of the four sectors shown in FIG. 4 is erased. For example, what has been targeted is assumed to be the track which has its first three sectors #0, #1 and 2 recorded with audio signals continuously, and its last sector #3 not recorded with audio signal yet, but to be treated for erasing the recorded audio signal of the sector #2.

FIGS. 7(a) and 7(b) show the timed relation of the output 32B of the separation circuit 32 with the start flag detection pulse produced from the start flag detection circuit 34. FIGS. 8(a)–8(c) show the timing of production of the flag gate pulse 36B and the selection signal 36E from the timing pulse generating circuit 36 relative to the start flag detection pulse from the start flag detection circuit 34. FIGS. 9(a)–9(g) show the timed relation of the various signals relative to the flag gate pulse 36B in the editing stage.

The FM signal reproduced from the magnetic head 22 is applied through the switch 24 and the pre-amplifier 26 to the FM demodulator circuit 28 where it is FM demodulated. The demodulated signal from the FM demodulator circuit 28 is then subjected to de-emphasis treatment at the de-emphasis circuit 30, and then separated into the flags and control signal portions in passing through the separation circuit 32. Since the sectors #0, #1 and #2 have been recorded with audio signals and the sector #3 has not been recorded with any audio signal, the output 32B of the separation circuit 32 takes such a form as shown in FIG. 7(a). Responsive to this, the start flag detection circuit 34 produces start flag detection pulses shown in FIG. 7(b) in synchronism with the start flags.

Upon receipt of the start flag detection pulses, the timing pulse generating circuit 36 produces flag gate pulses 36B and control signal gate pulses 36A in the timing corresponding to the sectors in which the flags or control signals are desired to be rewritten. For erasure of the recorded audio signal of the sector #2, the flags and the control signals of the sectors #1 and #2 have to be rewritten. Because the still video floppy disk rotates one revolution in one vertical synchronizing period (V), the timing pulse generating circuit 36 produces the flag gate pulses 36B (FIG. 8(b)) in the timing delayed by 1V from the the start flag detecting pulses of the sectors #1 and #2, and, after the completion of reproduction of one track, also produces the selection signal 36E at a time when, or just before, the leading edge of the same track reaches the magnetic head 22, which moves the switch 24 to the position 24a for the recording mode.

FIGS. 9(a)–9(g) show in more detail the timed relationship of all the signals after the switch 24 has changed over to the recording mode position 24a. After 2.23±0.1 microsecond from the falling edge of the pulse for start flag on the line of the flag gate pulse 36B (FIG. 9(b)), the timing pulse generating circuit 36 produces a control signal gate pulse 36A (FIG. 9(c)). The time space between the flag gate pulse 36B for start flag and the control signal gate pulse 36A should match the standard for the still video format. For the sector #1, therefore, in synchronism with this flag gate pulse 36B or control signal gate pulse 36A, the timing pulse generating circuit 36 changes the selection signal 36D to H (FIG. 9(d)), causing the switch 64 to move to the position 64a.

By the flag gate pulse 36B and the control gate pulse 36A, the AND gates 42 and 44 are gated on respectively to pass a new flag and a new control signal from the flag generating circuit 40 and the control signal generating circuit 38 through the OR gate 46 to the adder 48 in specified timings. The output of the OR gate 46 is shown in FIG. 9(g). Since at this time the recorded audio signal in the sector #1 need not be altered, the switch 48 may be left in the position 48b, and the switch 62 in the position 62a. Therefore, the actuating signal 36F (FIG. 9(f)) for the switch 48 remains L, and the actuating signal 36C (FIG. 9(e)) for the switch 62 is H. Thereby, the adder 52 is caused to produce only the flag and control signal. In conclusion, the output of the adder 52 is the same as the output of the OR gate 46. It is then handled by the pre-emphasis circuit 54, then by the FM modulator circuit 56, and then applied through the recording amplifier 58 and the switches 62, 64 and 24 to the magnetic head 22, thus being written at a prescribed location on the floppy disk 20 in a superimposed relation.

For the next sector #2, there is no need to record the control signal, and, as a matter of course, also to record audio signals. To standardize the signal treatments, the control signal gate pulse 36A is used as produced in a predetermined time from the pulse for start flag on the line of flag gate pulse 36B. Now, however, the control signal generating circuit 38 does not produce the control signal. At the output of the OR gate 46, therefore, as shown in FIG. 9(g), there are produced only the start and end flags, indicating that the sector is vacant. By the selection signals 36D and 36C of the timing pulse generating circuit 36, the switch 64 is moved to and maintained in the position 64a for a period corresponding to the period of recording the control signal and an audio signal, and the switch 62 in the position 62b for a period corresponding to the period of recording the audio signal. During the period when the switch 62 is set in the position 62b, the erasing current is supplied to the magnetic head 22, thus erasing the recorded audio signal.

Thus, the alteration of the flags and the control signal has been completed with the result that the audio signal which was recorded up to the sector #2 is cut short to be in the sector #1, and the flags (and control signal) of the sector #2 indicate that an audio signal is not as yet recorded therein.

While the foregoing embodiment has been described in connection with an example of erasing the sound-recorded sector, the invention is applicable to the purpose of inserting an audio signal additional to the recorded one. For this case, the flags and control signal of the latest sector are altered in the way described above. Then, for the sector for the additional audio signal, the switch 48 is moved to the position 48aso that the new flags and new control signal are recorded along with that audio signal.

It will be appreciated from the foregoing that according to the embodiments of the invention, the associated information in the areas related with the recorded main signal can be altered at any location and in a simple fashion. Hence, without any adverse effect on the main signal recorded area, the recorded subordinate of the pertinent sector can be edited.

Also, as has been described in connection with FIG. 1 to FIG. 3, according to this embodiment, the re-start of recording an audio signal in a different track from that accessed for the preceding cycle of a recording operation is made coincident with actuation of the pause release, thereby giving an additional advantage that the manageability is very good.

Also, while, as, in the above-described embodiments, the principal information signal and that concomitant information signal which is to be reproduced in paired relation with the reproduced principal information signal are made equivalent in the record bi code to the video signal for still picture and that audio signal which is to be reproduced in paired relation with the reproduced video signal, the memory means for storing both of these signals has been in the form of the floppy disk capable of recording the mixture of the audio and video signals in the format suited to the standard on the still video, the present invention is not confined thereto. Within the scope and spirit of the claims of the invention, variations may be made. For example, as the memory means, use may be made of a tape-shaped medium or card-shaped medium. Also, a solid state memory such as semiconductor memory or Bloch line memory may be used.

What is claimed is:

1. A recording apparatus for recording a continuous information signal in a plurality of memory blocks, comprising:
    (a) generating means for generating a pause start command and a pause release while information recording is in progress;
    b) storing means for storing said continuous information temporarily;
    (c) recording means for recording said continuous information stored in said storing means in said memory blocks, said recording means being arranged to record said continuous information together with an end signal of said continuous information; and
    (d) means associated with the pause start command generated by said generating means for causing said recording means to record the continuous information stored in said storing means, without recording said end signal, when said pause start command is generated, said means being responsive to the storage of said continuous information in said storage means for a predetermined period to cause said recording means to record said continuous information stored in said storage means, and said means being arranged to record said end signal when the pause condition by said pause start command is not released and a record terminating command is given.

2. An apparatus according to claim 1, wherein said memory blocks are concentric tracks formed on a disk-shaped recording medium.

3. An apparatus according to claim 1, wherein said generating means produces the pause start command and the pause release command in response to a manual operation.

4. An apparatus according to claim 1, further comprising:
    (e) means, when a recording on one memory block is followed by a recording on the next memory block, for recording the block number of said next memory block in said one memory block.

5. An apparatus according to claim 1, wherein said information signal is an audio signal.

6. An apparatus according in claim 1, wherein said recording means is arranged to record a predetermined amount of said continuous information, at a time, into said memory blocks.

7. An apparatus according to claim 6, wherein said memory blocks are concentric tracks formed on a disk-shaped recording medium.

8. An apparatus according to claim 1, further comprising:
    means for starting a storing of said continuous information into said storing means in response to said pause release command.

9. An apparatus according to claim 8, wherein said generating means produces the pause start command and the pause release command in response to a manual operation.

10. A recording apparatus for recording a continuous information signal in a plurality of memory blocks, comprising:
    (a) generating means for generating a pause start command and a pause release command while information recording is in progress;

(b) storing means for storing said continuous information temporarily;

(c) recording means for recording said continuous information stored in said storing means in said memory blocks, said recording means being arranged to record said continuous information together with an end signal of said continuous information; and (d) means associated with the pause start command generated by said generating means for causing said recording means to record the continuous information stored i said storing means, without recording said end signal when said pause start command is generated by said generating means and being responsive to the pause release command for causing said storing means to store the continuous information, said means being responsive to the storage of said continuous information in said storage means for a predetermined period for causing said recording means to record said continuous information stored in said storage means, and said means being arranged to record said end signal when the pause condition by said pause start command is not released and a record terminating command is given.

11. An apparatus according to claim 10, further comprising:

(d) means, when recording on one memory block is followed by recording on a next memory block, for recording the block number of said next memory block in said one memory block.

12. An apparatus according to claim 11, further comprising:

(e) means for commanding a termination of recording at a time during the stopping of the recording by said stopping means; and (f) means responsive to termination of recording commanded by said commanding means for revising the block number recorded by said recording means.

* * * * *

UNITED STATES PATENT AND TRADEMARK OFFICE
CERTIFICATE OF CORRECTION

PATENT NO. : 5,161,070

DATED : November 3, 1992

INVENTOR(S) : Tomotaka Muramoto, Hirokazu Takahashi, Hiroyuki Horii and Masashi Hori It is certified that error appears in the above-identified patent and that said Letters Patent is hereby corrected as shown below: Title page, item [57]

ABSTRACT, line 4.   After "at" insert -- the --

Col. 1, line 47.   After "recorded" insert -- on a --

Col. 4, line 35.   Change "Circuit so" to -- Circuit 20 --

Col. 5, line 15.   Change "deject" to -- reject --

Col. 5, line 18.   Change "key board" to -- keyboard --

Col. 5, line 49.   After "state," insert -- the time --

Col. 6, line 36.   Change "later continued again" to -- continued again later --

Col. 6, line 37.   Change "key board" to -- keyboard --

Col. 9, line 36.   Change "48aso" to -- 48a so --

Col. 9, line 57.   Change "bi" to -- bit --

Col. 11, line 12.   Change "i" to -- in --

Signed and Sealed this

Twenty-first Day of December, 1993

Attest:

BRUCE LEHMAN

Attesting Officer

Commissioner of Patents and Trademarks